(12) United States Patent
Hoeller et al.

(10) Patent No.: US 7,726,208 B2
(45) Date of Patent: Jun. 1, 2010

(54) COMBINED STEERING ANGLE AND TORQUE SENSOR

(75) Inventors: Reinhold Hoeller, Auerbach (DE); Dirk Raschke, Auerbach (DE); Herbert Wallner, Auerbach (DE); Hans-Ludwig Goetz, Hahnbach (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 8 days.

(21) Appl. No.: 11/985,097

(22) Filed: Nov. 14, 2007

(65) Prior Publication Data

US 2008/0150519 A1 Jun. 26, 2008

(30) Foreign Application Priority Data

Nov. 22, 2006 (DE) .................. 10 2006 055 049
May 21, 2007 (EP) ................... 07010069

(51) Int. Cl.
*G01L 3/00* (2006.01)
*G01B 7/30* (2006.01)

(52) U.S. Cl. .................. 73/862.331; 324/207.25; 324/207.17

(58) Field of Classification Search ..................
73/862.325–862.339; 324/207.16–207.17, 324/207.25, 207.2
See application file for complete search history.

(56) References Cited

U.S. PATENT DOCUMENTS

| | | | |
|---|---|---|---|
| 4,356,732 A | | 11/1982 | Hachtel et al. |
| 5,083,468 A | | 1/1992 | Dobler et al. |
| 5,200,747 A | * | 4/1993 | Betz et al. .................. 324/714 |
| 5,365,168 A | | 11/1994 | Reichl |
| 5,406,155 A | * | 4/1995 | Persson .................. 324/207.25 |
| 5,442,956 A | * | 8/1995 | Persson .................. 73/862.339 |
| 5,646,523 A | * | 7/1997 | Kaiser et al. ............ 324/207.25 |
| 5,838,222 A | * | 11/1998 | Al-Rawi ...................... 338/198 |
| 5,900,930 A | * | 5/1999 | Simon et al. ................. 356/138 |
| 6,250,420 B1 | | 6/2001 | Brenner et al. |
| 6,367,337 B1 | * | 4/2002 | Schlabach .............. 73/862.331 |
| 6,384,598 B1 | | 5/2002 | Hobein et al. |
| 6,443,020 B1 | * | 9/2002 | Lin et al. ................ 73/862.334 |
| 6,520,031 B2 | * | 2/2003 | Madni et al. ........... 73/862.326 |
| 6,534,970 B1 | * | 3/2003 | Ely et al. ................ 324/207.17 |
| 6,568,284 B1 | * | 5/2003 | Reichl et al. ........... 73/862.333 |

(Continued)

FOREIGN PATENT DOCUMENTS

DE    29 51 148    7/1981

(Continued)

*Primary Examiner*—Lisa M Caputo
*Assistant Examiner*—Jonathan Dunlap
(74) *Attorney, Agent, or Firm*—Jordan and Hamburg LLP

(57) ABSTRACT

A combined steering angle and torque sensor that inductively and with eddy current damping generates two absolute angle measurement signals over an angle range of 360 degrees including a first damping rotor being disposed on an end of an input shaft of steering column divided by a torsion element; a second damping rotor being disposed on an end of an output shaft of the steering column; at least one carrier being fixed to a housing of the steering column and through which the steering column passes at a right angle, the at least one carrier being fitted with flat coils in a complete angle range; and at least one passive actuating element, without periodically repeated structures, being borne on each of said first and second damping rotors, the actuating elements being in two different locations of said angle range acting on the flat coils of the at least one carrier.

11 Claims, 7 Drawing Sheets

U.S. PATENT DOCUMENTS

| | | | |
|---|---|---|---|
| 6,860,159 B2 * | 3/2005 | Jin et al. | 73/862.331 |
| 6,864,681 B1 * | 3/2005 | Horner et al. | 324/207.25 |
| 6,894,487 B2 * | 5/2005 | Kunz-Vizenetz | 324/207.25 |
| 6,985,018 B2 * | 1/2006 | Madni et al. | 73/862.326 |
| 7,406,884 B2 * | 8/2008 | Jerems et al. | 73/862.331 |
| 2003/0020450 A1 * | 1/2003 | Neumann et al. | 324/76.49 |
| 2004/0015307 A1 * | 1/2004 | Heisenberg | 702/72 |
| 2004/0085063 A1 * | 5/2004 | Jin et al. | 324/207.16 |
| 2006/0037410 A1 * | 2/2006 | Gierut | 73/862.335 |
| 2006/0081070 A1 * | 4/2006 | Madni et al. | 73/862.325 |
| 2007/0289395 A1 * | 12/2007 | Hirzmann | 324/654 |
| 2008/0048653 A1 * | 2/2008 | Sanders | 324/207.25 |

FOREIGN PATENT DOCUMENTS

| | | |
|---|---|---|
| DE | 37 29 230 | 3/1989 |
| DE | 42 11 616 | 10/1993 |
| DE | 42 32 994 | 4/1994 |
| DE | 197 16 321 | 10/1998 |
| DE | 197 23 069 | 10/1998 |
| DE | 199 41 464 | 3/2001 |
| DE | 100 46 660 | 11/2001 |
| DE | 100 65 240 | 7/2002 |
| DE | 101 01 174 | 7/2002 |
| DE | 101 56 238 | 6/2003 |
| DE | 10 2004 027 954 | 12/2005 |
| WO | WO-99/21747 | 5/1999 |

* cited by examiner

Special contour of the catch element for the multi turn counter

15

Multi turn counter

COMBINED STEERING ANGLE AND TORQUE SENSOR

BACKGROUND OF THE INVENTION

The invention relates to a combined steering angle and torque sensor that inductively and with eddy current damping generates two absolute angle measurement signals over an angle range of 360 degrees.

For such measurements the steering column is normally divided by a torsion element at an abutment. The input shaft faces the steering wheel and bears a first actuating element in the vicinity of the twisted abutment. The output shaft of the steering column is associated with the steering gear and bears a second actuating element in the vicinity of the twisted abutment.

In this technical context, known in the prior art are (i) an inductive measurement technique by means of eddy current damping, (ii) measurement planes perpendicular to the axis of rotation, and (iii) two annular disk-shaped electrical damping members that are attached to the steering column on both sides of the torsion element; see the prior art in accordance with DE 29 51 148 C2, DE 37 29 230 C2, DE 101 01 174 B4, DE 199 41 464 A1, DE 101 56 238 A1, and DE 10 2004 027 954 A1. Known from one or the other of these publications are also (iv) two angle sensors, that are independent of one another, in two measurement planes, (v) a plurality of flat coils in one measurement plane, and (vi) flat coils that are not only staggered radially, but are also arrayed along the circumference over 360 degrees. In patent DE 101 01 174 B4, the elastic element is arranged outside of the longitudinal axis of the steering column, specifically on the steering wheel.

In the fields of automobiles, trucks, and commercial vehicles, in the past the steering angle and the torque have been detected using two separate sensors that have different principles of functioning (inductive, optical, capacitive, magnetic, etc.). Based on the high resolution that is required, many of the current torque sensors permit only a small torque range that is expressed as an angle on the order of magnitude of +/−10 degrees. In many multiturn sensors the steering angle range is also determined by the required accuracy and is often limited. Redundancy is increasingly demanded because these sensors are used in safety-related applications. Frequently a larger amount of space is required overall.

The object of the invention is comprised in providing a combined sensor in a small space despite the redundancy and steering angle/torque dual function.

SUMMARY OF THE INVENTION

The invention is in particular concerned with code disks and similar actuating elements, the structures of which repeat periodically on the circular circumference and that permit only incremental measurements. In contrast, the apparatus according to the invention generates two absolute angle measurement signals on one given circular circumference. The invention furthermore has to do with complex multiturn sensors.

An inductive steering angle and torque sensor based on eddy current damping has proved to be a favorable measurement principle. A first damping rotor is connected to the input shaft of the steering column (that is divided by a torsion element), and a second damping rotor is seated on the opposing end of the output shaft. Both damping rotors bear a passive actuating element for the eddy current damping, specifically in that they are offset by an angle to one another in the same measurement plane. Disposed in the measurement plane fixed to the housing is a sensor carrier through which the divided steering column passes at a right angle and which is fitted with a plurality of flat coils in the complete angle range of 360 degrees. Acting on this sensor ring are the two site-selective actuating elements at two different locations that can usefully oppose one another offset by about 180 degrees. The signals of all, preferably four, flat coils are always measured. The absolute angle measurement signal resulting from the output shaft (or a composite signal from the two measurements) then represents the steering angle, while the torque can be found from the difference of the two angle measurement signals and the elasticity of the torsion element.

For the purposes of redundant angle measurement, provided in the vicinity of the abutment of the divided steering column is a second sensor carrier that is fixed to the housing and through which the steering column passes at a right angle, as well. It is fitted in the same manner as the first carrier with additional flat coils in the entire angle range of 360 degrees, however in a second measurement plane. The damping rotors each usefully carries on the back side a second actuating element, again without periodically repeated structures, for the second measurement plane.

A multiturn counter is also needed since the steering angle can exceed a complete rotation of 360 degrees or −180 degrees to +180 degrees in each direction. In the instant case this is attained using a Geneva wheel having a magnetic tablet. The multiturn counter with magnetic tablet is driven incrementally by a catch element attached to the damping rotor of the output shaft with each complete rotation of the steering column. In the preferred exemplary embodiment, the increment is one seventh of a complete rotation. The magnetic tablet generates incremental counting signals in Hall sensors that are also arranged on the sensor carrier. Each incremental signal stands for one complete rotation of the output shaft of the steering column. Any other contactless transmission principle can also be used for the multiturn sensor instead of the permanent magnet and Hall sensors.

The measurement signal is evaluated digitally. The sensor coils are e.g. each part of a Colpitt oscillator, the digital output signal of which can be evaluated directly. The oscillator frequency represents a largely linear measure for the measurement angle in the measurement range. The combination of the inductive measurement principle and the digital evaluation permits a combination sensor in the smallest possible space. One preferred exemplary embodiment of the invention shall be explained using the patent drawings.

DETAILED DESCRIPTION OF THE INVENTION

Figure 1A:
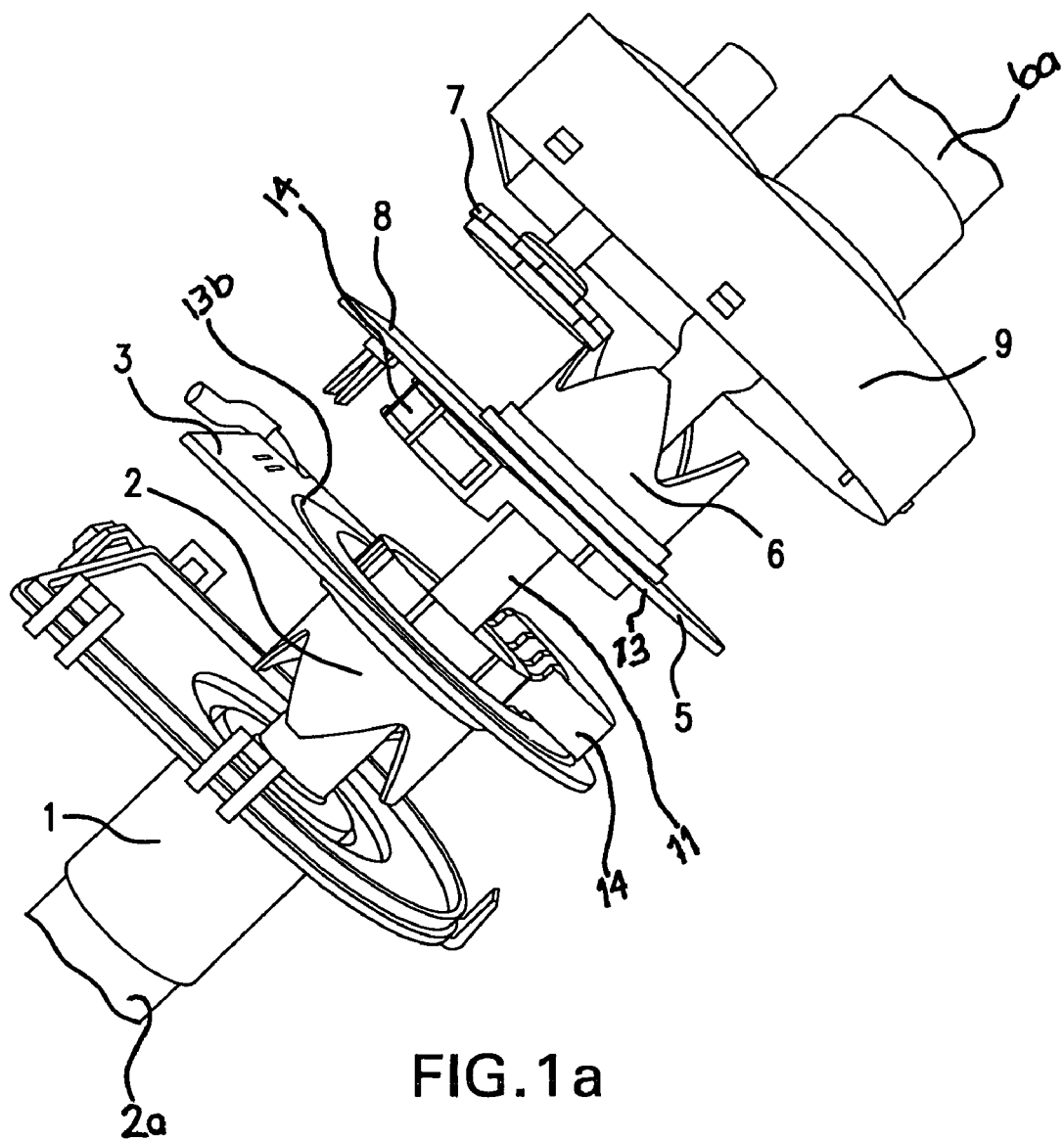
FIG. 1a is a perspective elevation of a combined multiturn steering angle and torque sensor according to the invention (housing with bottom and housing cover and multiturn sensor pulled apart axially)
Figure 1B:
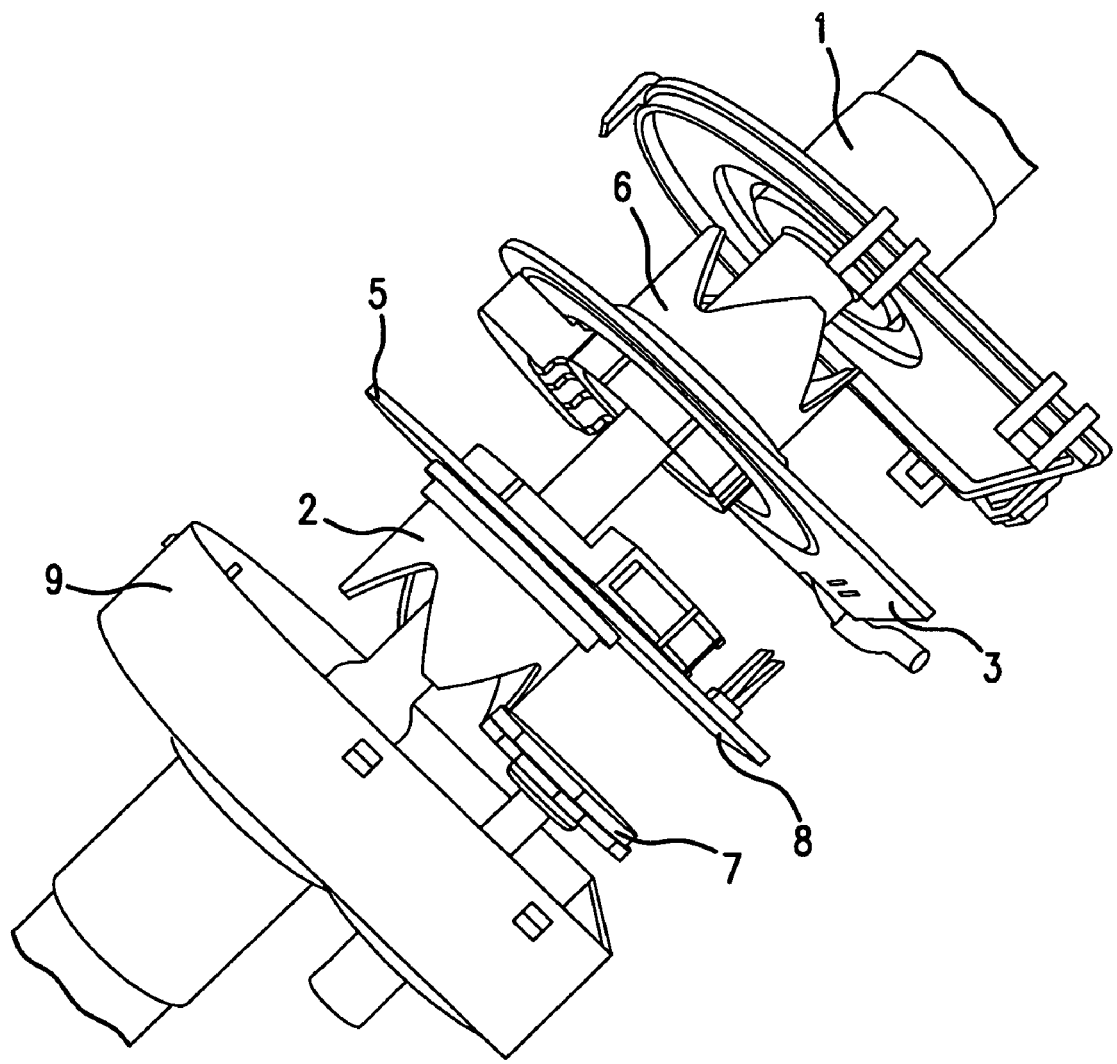
FIG. 1b is a perspective elevation of a combined multiturn steering angle and torque sensor in accordance with the invention (housing with bottom and housing cover and multiturn sensor pulled apart axially); but the multiturn sensor is attached to the input shaft of the combined sensor.
Figure 8:
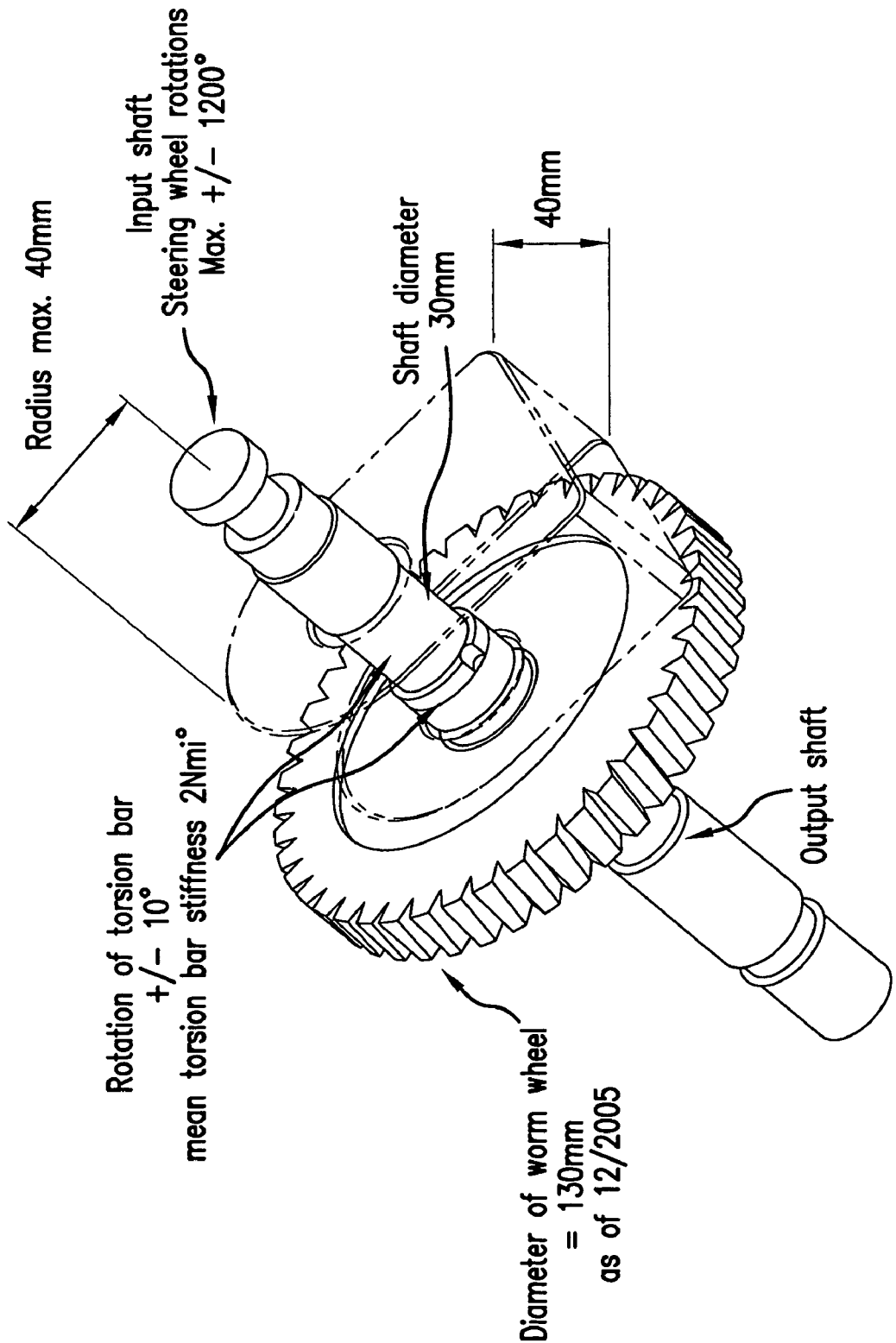

In FIG. 1a a housing 9, including a bottom and a housing cover 1, is pulled apart in the axial direction of the steering column 2a, 6a so that an exemplary embodiment of the inventive combination sensor can be seen. FIG. 8 depicts the installation site for this housing 1, 9 on the steering column 2a, 6a in greater detail. The steering column is divided by an input shaft 2a and an output shaft 6a. A worm wheel that belongs to the gear housing 2a is seated on the output shaft 6a. Adjacent thereto is the abutment 12 of the input shaft 2a and of the output shaft 6a, which passes through the sensor housing 1, 9. In accordance with FIG. 1b, the multiturn sensor 7 can also be arranged on the input shaft 2a in order to save space.

Figure 6:
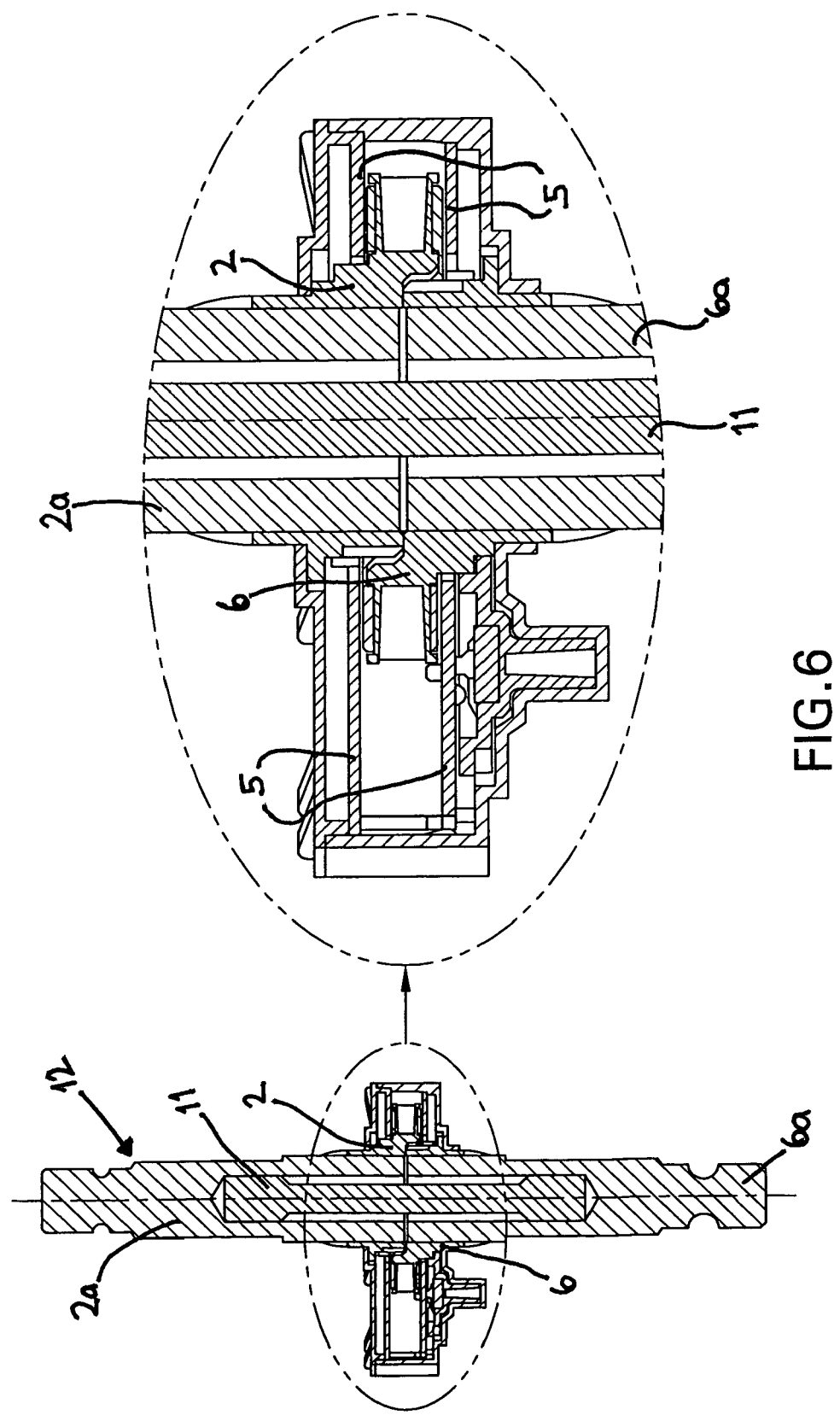
FIG. 6 is a section through the steering column and through the inventive sensor and an enlarged excerpt.

The axial section of the input shaft 2a, the output shaft 6a, and an interiorly situated torsion bar 11 can be seen in FIG. 6. The elastic rotation of the torsion bar 11 determines the relative angle difference for the shaft ends at the abutment 12 as a function of the acting torque that is transmitted by the steering wheel. FIG. 6 also provides an enlarged depiction of a portion of the sensor, in cross-section.

Returning to FIG. 1, a damping rotor 2 is connected to the end of the input shaft 2a. "Damping" from this point on means electrical eddy current that occurs as a change in inductivity in the measurement coils. A corresponding damping rotor 6 is connected to the end of the output shaft 6a.

Figure 2:
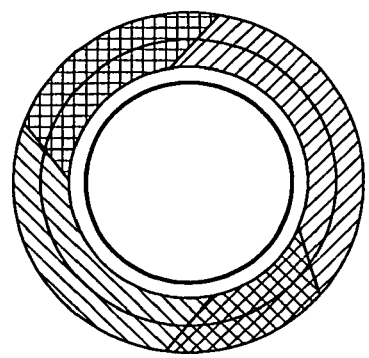
FIG. 2 depicts a sensor carrier (printed circuit board, panel) having a plurality of flat coils in an arc.

Reference designator 5 identifies a sensor panel or sensor carrier that bears a plurality of flat coils 13 in a circular arrangement. The sensor carrier 5 is mounted fixed to the housing (1, 9) and the divided steering column 2a, 6a passes therethrough at a right angle. FIG. 2 depicts the arrangement of four flat coils 13 more precisely in a top view. It has proved useful not to permit the separating line between every two flat coils 13 to run exactly radially. The number and shape of the flat coils is defined depending on the requirements for precision.

Returning to FIG. 1, each of the damping rotors 2 and 6 bears an actuating element 14 in the measurement plane that faces the flat coils 13. The actuating elements 14 are for instance thin aluminum plates that are attached to the end faces of the damping rotors 2 and 6. Like an eddy current brake they act selectively by site on the flat coils 13 in accordance with FIG. 2.

The length of the actuating element 14 is less than ¼ of the circular circumference so that the eddy current damping acts site-selectively on two of the four flat coils 13 in accordance with FIG. 2. It is important for the site-selective functioning that the actuating element 14 does not extend beyond the entire circular circumference and does not have any periodically repeating structures.

The actuating elements 2b and 6b act at two different locations on the arc-shaped coil arrangement 13. In particular they are offset to one another in the same measurement plane by about 180 degrees. Since the signals generated by the flat coils 13 are measured continuously, at least two absolute angle measurement signals are continuously available on the entire circle circumference of 360 degrees. Both the steering angle and the torque can be determined from these signals using a digital evaluation circuit.

In this technology, which forms the transition to "steer-by-wire", frequently a redundancy is required that copes with the failure of individual components with nothing further. This redundancy is very simple to achieve in the technology in accordance with FIG. 1. Provided on the other side of the abutment 12 is an additional sensor carrier 3 that with its flat coils 13b forms another measurement plane. For this purpose, the same damping rotors 2 and 6 carry, on the back side of the first actuating elements 2b and 6b, additional actuating elements 2c and 6c that act at a slight distance from the other flat coils 13b in the second measurement plane. The structure and function of the other carrier panel 3 are entirely the same.

Figure 5:
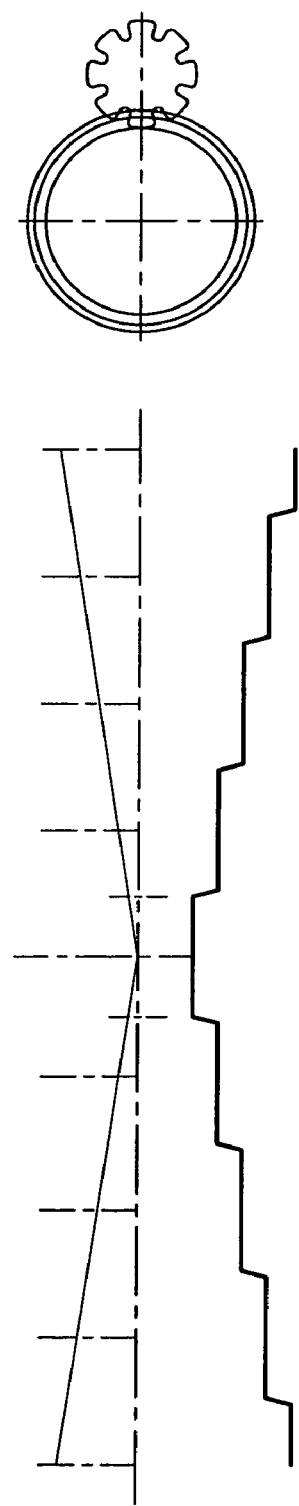
FIG. 5 is an axial perspective showing how the damping rotor and the multiturn counter engage in accordance with FIGS. 3 and 4 and depicting the steering angle that can be detected thereby.

Finally, the sensor structure in accordance with FIG. 1 takes into account the fact that in particular in trucks the steering angle can exceed the range of a complete circular circumference of −180 degrees to +180 degrees. A multiturn counter 7 is also arranged in the housing 1, 9 for this purpose. In FIG. 1 the multiturn counter 7 is pulled out axially together with the housing bottom 9; when assembled it is in a plane with the damping rotor of the output shaft 6a or of the input shaft 2a. The damping rotor 6 and the multiturn counter 7 then engage one another, as can be seen in the side view in accordance with FIG. 5. In accordance with FIG. 3, the damping rotor 6 for it at one exterior location of the circumference carries a catch element 15 that causes the Geneva wheel 7 to be carried along incrementally. In the preferred exemplary embodiment, the Geneva wheel 7 has seven catch elements distributed on the circular circumference. The multiturn counter 7 thus provides an indication of which of the seven rotational periods the steering column is in. This absolute steering angle of 7 times 360°=−1260° to +1260° together with the seven states of the multiturn counter 7 is graphically depicted in FIG. 5.

For evaluation, the multiturn counter 7, which comprises the special drive wheel that is matched to the catch element of the damping rotor, contains a magnetic tablet. The rotations of the steering column are detected using the magnetic tablet in that e.g. two additional Hall sensors 8 are arranged on the sensor panel 5. Using the mechanics of the Geneva wheel that is carried along, rapid wear and noise emissions can be prevented in comparison to the conventional toothed wheels that are usual today. Because generally the multiturn Geneva wheel 7 will not move until there is a steering angle of approx. +/−170° or more.

Figure 3:
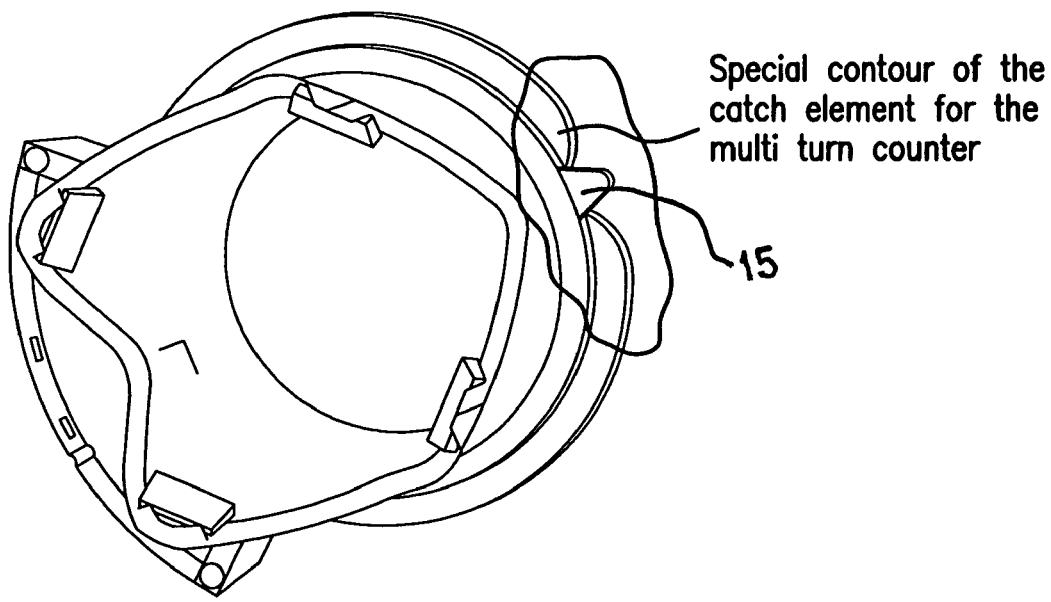
FIG. 3 is a perspective elevation of the damping rotor of the steering column output shaft, depicted from the side of a catch element for the multiturn counter.
Figure 4:
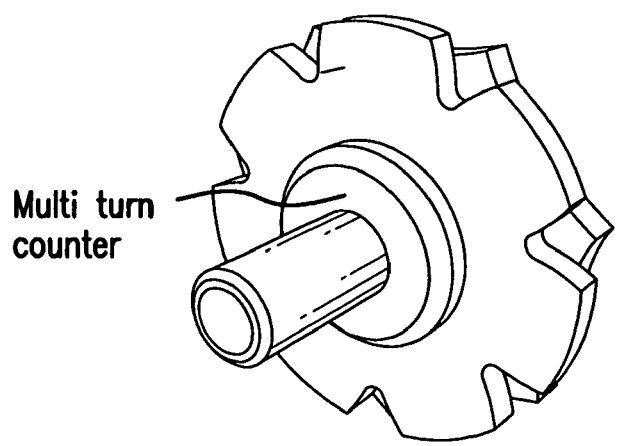
FIG. 4 is a perspective elevation of the multiturn counter in accordance with the invention.
Figure 7:
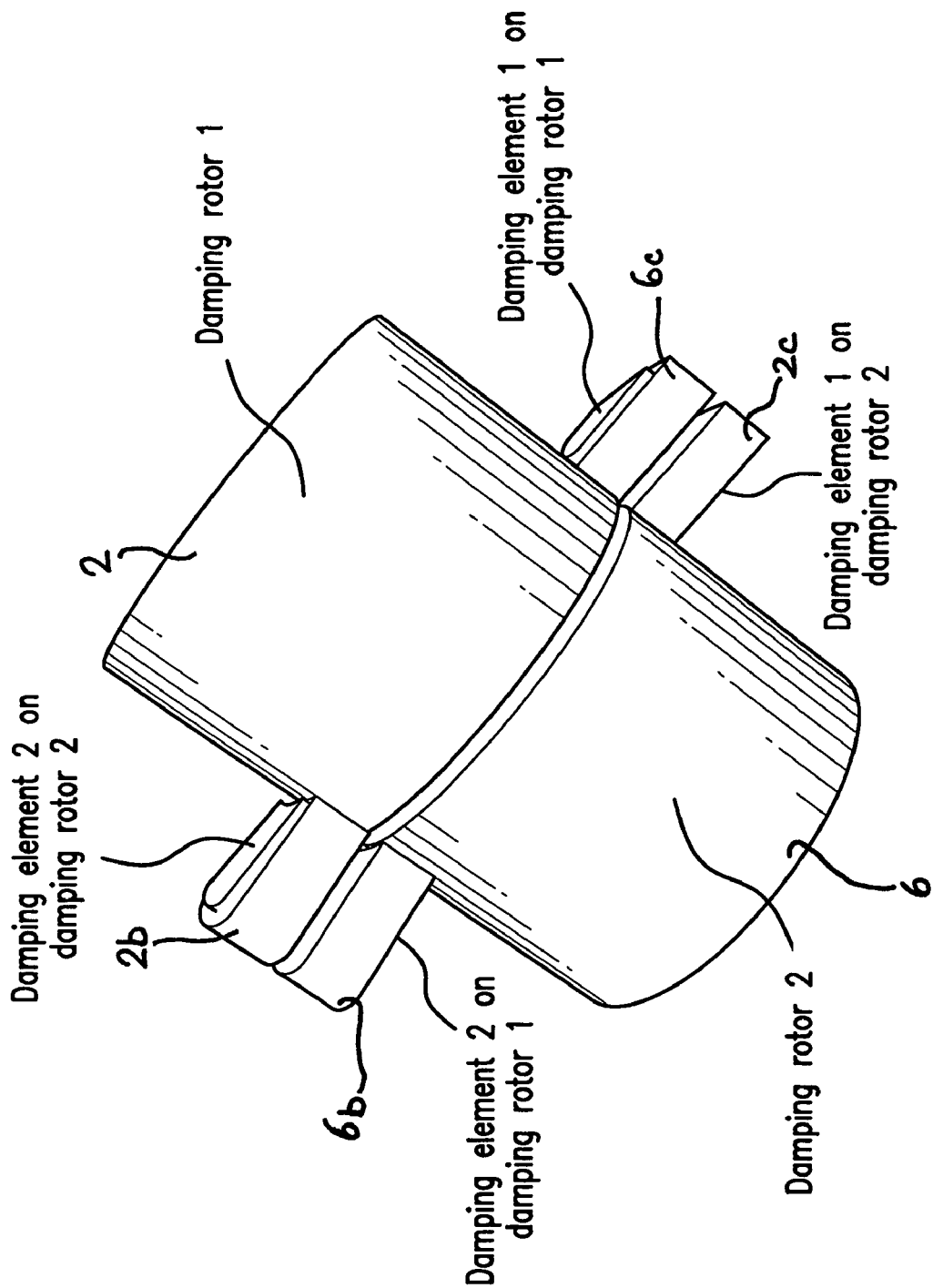
FIG. 7 depicts another exemplary embodiment for the opposing damping rotors; and, FIG. 8 depicts the installation site and space for the sensor on the steering column, the combined sensor in accordance with the invention being indicated by its assembled housing parts in accordance with FIG. 1.

Alternative to FIG. 3, FIG. 7 in connection with FIG. 1 depicts another exemplary embodiment for opposing damping rotors. In this case, the shape of the lugs on which the damping elements are situated has been modified. For the second damping element, it is no longer the back side of the lug that reaches into the second measurement plane that is used, but rather a second, separate lug is provided for the other damping element. As a result the angle data can be transmitted to a central regulation and control device for the passenger vehicle, truck, or commercial vehicle in an operationally secure manner, with great locational resolution, and in real-time.

The invention claimed is:

1. A combined steering angle and torque sensor that inductively and with eddy current damping generates two absolute angle measurement signals over an angle range of 360 degrees, comprising:

a first eddy current damping rotor being disposed on an end of an input shaft of a steering column divided by a torsion element;

a second eddy current damping rotor being disposed on an end of an output shaft of the steering column;

at least one carrier being fixed to a housing of the steering column and through which said steering column passes at a right angle, said at least one carrier being fitted with flat coils extending throughout said angle range of 360 degrees; and at least one passive actuating element, without periodically repeated structures, being borne on each of said first and second eddy current damping rotors and positioned within a periphery of said at least one carrier and coils thereof, said actuating elements being in two different locations of said angle range and acting on said flat coils of said at least one carrier.

2. A combined steering and torque sensor according to claim 1, wherein said actuating elements respectively borne on said first and second eddy current damping rotors oppose one another by about 180 degrees in one measurement plane.

3. A combined steering and torque sensor according to claim 1, further comprising a second carrier that is fixed to the housing and through which said steering column passes in a vicinity of an abutment, said second carrier being fitted with additional flat coils in the complete angle range of 360 degrees for redundant angle measurement.

4. A combined steering and torque sensor according to claim 3, wherein said first and second eddy current damping rotors each carries on a back side thereof a second actuating element that is without periodically repeated structures and that acts on said additional flat coils of said second carrier to provide redundant angle measurement.

5. A combined steering and torque sensor according to claim 3, wherein said first and second eddy current damping rotors include first and second actuating lugs and actuating elements.

6. A combined steering and torque sensor according to claim 1, further comprising a multiturn counter that is driven incrementally by a catch element attached to said second eddy current damping rotor of said output shaft with each complete rotation of said steering column.

7. A combined steering and torque sensor according to claim 6, wherein said multiturn counter includes a magnetic tablet which generates incremental counting signals for complete rotations of said output shaft of said steering column in Hall sensors arranged on said at least one carrier.

8. A combined steering angle and torque sensor according to claim 7, wherein said multiturn counter includes a Geneva wheel which is incrementally driven by said catch element.

9. A combined steering angle and torque sensor according to claim 8, wherein seven catch elements are distributed on a circular circumference of said Geneva wheel.

10. A combined steering angle and torque sensor according to claim 6, wherein said multiturn counter includes a Geneva wheel which is incrementally driven by said catch element.

11. A combined steering angle and torque sensor according to claim 10, wherein seven catch elements are distributed on a circular circumference of said Geneva wheel.

\* \* \* \* \*